United States Patent [19]

Ohta et al.

[11] Patent Number: 5,368,908
[45] Date of Patent: Nov. 29, 1994

[54] OPTICAL INFORMATION RECORDING MEDIUM

[75] Inventors: Wasaburo Ohta; Isamu Orima; Masashi Nakazawa, all of Yokohama; Yuzi Onodera; Kazuhiro Umeki, both of Hanamaki, all of Japan

[73] Assignee: Ricoh Company, Ltd., Tokyo, Japan

[21] Appl. No.: 727,067

[22] Filed: Jul. 8, 1991

[30] Foreign Application Priority Data

Jul. 9, 1990 [JP] Japan ................................ 2-181052
Jan. 14, 1991 [JP] Japan ................................ 3-014866
Jun. 14, 1991 [JP] Japan ................................ 3-143452

[51] Int. Cl.⁵ .......................................... B32B 3/00
[52] U.S. Cl. .......................................... 428/64; 428/65;
428/457; 428/446; 428/702; 428/913; 430/945;
346/76 L; 346/135.1

[58] Field of Search .................. 428/64, 65, 457, 446,
428/913, 702; 430/945; 346/76 L, 135.1

[56] References Cited

U.S. PATENT DOCUMENTS 4,984,231 1/1991 Yasuoka .......................... 369/275.1
5,100,700 3/1992 Ide et al. ............................ 428/64

*Primary Examiner*—Patrick J. Ryan
*Assistant Examiner*—Elizabeth Evans
*Attorney, Agent, or Firm*—Cooper & Dunham

[57] ABSTRACT

An optical information recording medium, for writing in and reading out information by a laser beam, is composed of a recording layer, an anti-reflection layer structure formed on an outer surface section on which the laser beam is directed to be focused, on the recording layer, and the anti-reflection layer structure includes one or more transparent electroconductive film layers.

12 Claims, 2 Drawing Sheets

OPTICAL INFORMATION RECORDING MEDIUM

BACKGROUND OF THE INVENTION

1. Field of the Invention

The present invention relates to an optical information recording medium, and more particularly to an optical information recording medium, for writing in and reading out information by means of a laser beam, which comprises a recording layer, an anti-reflection layer structure formed on an outer surface section on which the laser beam is directed to be focused, on the recording layer, with the anti-reflection layer structure comprising one or more transparent electroconductive film layers.

2. Discussion of Background

Commonly-known, conventional optical information recording media for writing in and reading out information by means of a laser beam include optical disks for moving images and optical disks for audio, as well as the write-in type of disks and the like.

In these types of optical information recording media, an air sandwich system, provision of a protective layer, and the like are known as a method for protecting the recording medium on which the laser beam is applied. In addition, a method of providing an anti-reflection layer on the outer surface section of a recording layer to which the laser beam is to be applied is also known in order to prevent reflection from the outer surface section of the laser beam applied to the recording layer (Japanese Laid-Open Patent Application 59-79445).

The substrate for supporting the recording layer thereon in the conventional optical information recording medium is generally made of a dielectric material such as plastics including polycarbonate and acrylic resin, and glass. Because of the use of such a dielectric material, the optical information recording medium is generally apt to be electrically charged. Once the optical information recording medium is electrically charged, small dust is electrostatically attracted to the outer surface of the recording medium, and such dust hinders the writing in and reading out of the information, or the electric charge of the recording medium causes the malfunction of the electric circuits of a writing or reading device for the optical information recording medium. In order to prevent such charging of the optical information recording medium, provision of an antistatic layer on the outer surface of the recording medium is proposed as in Japanese Laid-Open Patent Application 60-239946.

Thus, it is desirable that the outer surface of the optical information recording medium have both an anti-reflection function and an antistatic function, but, conventionally, optical information recording media with such a dual function are unknown.

SUMMARY OF THE INVENTION

Accordingly, an object of the present invention is to provide, with due consideration to the drawbacks of such conventional materials, an optical information recording medium with an outer surface section having both an anti-reflection function and an anti-static function, whereby the reflection from the outer layer is small, and superior antistatic characteristics are obtained.

The above object of the present invention is achieved by an optical information recording medium, for writing in and reading out information by means of a laser beam, comprising a recording layer, an anti-reflection layer structure formed on an outer surface section of the recording layer, to which the laser beam is applied, and the anti-reflection layer structure comprising one or more transparent electroconductive layers.

Specifically, the laser beam is focused on the recording layer through the outer surface section of the optical information recording medium, and the anti-reflection layer structure is formed in this outer surface section. The anti-reflection layer structure is formed as a multilayer structure and one or more transparent electroconductive film layers are included inside the anti-reflection layer structure. The term "transparent" in the transparent electroconductive film layer means that this layer is transparent with respect to the laser beam which is focused on the recording layer. The position of the transparent electroconductive film layer provided within the anti-reflection layer structure is optional. Accordingly, the transparent electroconductive film layer may be provided as the film layer closest to the recording layer in the anti-reflection layer structure. The transparent electro-conductive film layer also may be interposed by the anti-reflection layers, or may be a section exposed directly on the outer section, specifically, a layer in contact with the atmosphere, which is formed on the surface of the anti-reflection layer structure. Each layer of the anti-reflection layer structure can be formed by evaporation or sputtering or by a vacuum film-forming process such as ion plating, or the like.

Various types of formed materials can be used as the anti-reflection layer structure, but the provision of a three-layered structure as an optical information recording medium wherein the anti-reflection layer structure comprises a layer of $SiO_2$ with a thickness of $\lambda/4$; a layer of $In_2O_3$ with a thickness of $\lambda/4$; and a layer of $SiO$ with a thickness of $\lambda/4$ with respect to the laser wavelength of $\lambda$, with these layers laminated in the order listed, from the side in contact with the atmosphere to the recording medium side surface, is desirable.

In addition, a three-layer structure wherein the anti-reflection layer structure comprises a layer with a refractive index in the range 1.2 to 1.9, having a thickness of $(\lambda/4) \times (0.9$ to $1.6)$ with repsect to the laser wavelength of $\lambda$, a layer with a refractive index in the range 1.5 to 2.5, having a thickness of $(\lambda/2) \times (0.1$ to $1.5)$ including a metal, and a layer with a refractive index in the range of 1.2 to 1.9, having a thickness of $(\lambda/4) \times (0.75$ to $1.6)$, wherein these layers are laminated in the order listed from the side in contact with the atmosphere to the recording medium side surface, is preferable.

Furthermore, a two-layer structure wherein the anti-reflection layer structure comprises a layer with a refractive index in the range 1.2 to 1.7, having a thickness of $(\lambda/4) \times (0.75$ to $1.6)$ with respect to the laser wavelength of $\lambda$, and a layer with a refractive index in the range 1.7 to 2.5, having a thickness of $(\lambda/4) \times (0.1$ to $2.2)$, wherein these layers are laminated in the order listed from the side in contact with the atmosphere to the recording medium side surface, is also preferable.

The optical information recording medium on which is formed an anti-reflection layer structure, wherein both write-in and read-out of information, or wherein either the write-in of information only or the read-out of information only is performed, is also acceptable. The anti-reflection layer structure can be formed in a read-only optical information recording medium in whcih a recording layer for recording information to be read out is formed as a metal thin-layer reflection type of recording layer with irregularities corresponding to the recorded information.

The information recorded on the recording layer may be audio information or video information or both, therefore, accordingy, the present invention can be applied to the CDs and LDs now on the market.

BRIEF DESCRIPTION OF THE DRAWINGS

These and other objects, features, and advantages of the present invention will become more apparent from the following description of the preferred embodiments taken in conjunction with the accompanying drawings, in which.

DETAILED DESCRIPTION OF THE PREFERRED EMBODIMENTS

Figure 1:
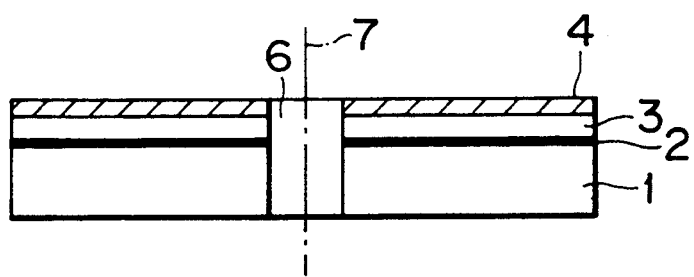
FIG. 1 is a schematic cross-sectional view of the structure of an example of an optical information recording medium of single-sided recording type according to the present invention.

FIG. 1 is a schematic cross-sectional view of an example of an optical information recording medium of a single-sided recording type according to the present invention, which is used as an optical audio disk. This optical information recording medium is formed in the shape of a disk and has a center hole 6 which is engaged by a drive shaft 7 to rotatingly drive the disk.

A recording layer 2 is formed on one side of a substrate 1, and a protective layer 3 is formed on the recording layer 2. A laser beam is directed from the side of the protective layer 3 and is focused on the recording layer 2. An anti-reflection layer structure 4 is formed on the protective layer 3, specifically, on the outer surface of the optical information recording medium on which the laser beam is directed.

Figure 2:
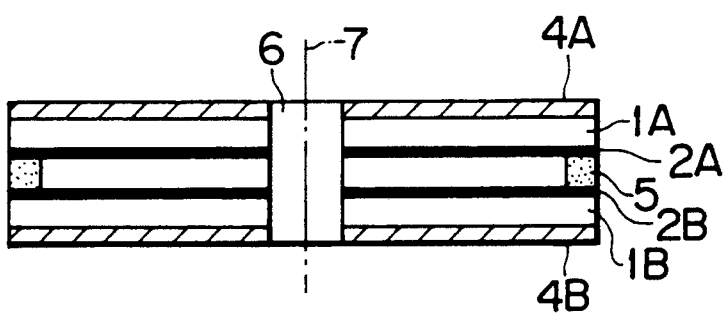
FIG. 2 is a schematic cross-sectional view of the structure of another example of an optical information recording medium according to the present invention.

FIG. 2 is a schematic cross-sectional view of another example of an optical information recording medium with an air sandwich structure according to the present invention. In this example the optical information recording medium also has the shape of a disk and the center hole 6 is engaged by the drive shaft 7 to rotatingly drive the disk. In this example, a substrate 1A on which is formed a recording layer 2A, and a substrate 1B on which is formed a recording layer 2B, are integrally formed, with the recording layers 2A and 2B facing each other, between which a spacer 5 is provided. The laser beam is focused on the recording layer 2A or the recording layer 2B through the substrate 1A or the substrate 1B respectively, which are both transparent to the laser beam. Accordingly, in this case, the outer surface sections on which the laser beam is directed, specifically, the anti-reflection layer structures 4A, 4B, are provided on the side surfaces opposite to those on which are provided the recording layers 2A, 2B of the substrates 1A, 1B.

Figure 5:
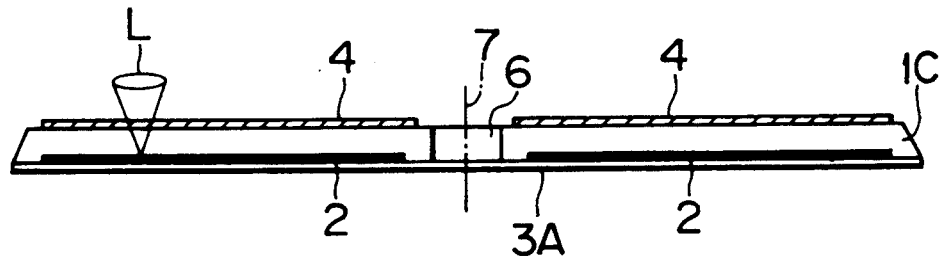
FIG. 5 is a schematic cross-sectional view of the structure of a further example of an optical information recording medium according to the present invention.

FIG. 5 is a schematic cross-sectional view of a further example of an optical information recording medium according to the present invention.

In this optical information recording medium, a recording layer 2 is formed on one side of a substrate 1C which is transparent to a laser beam, and a protective layer 3A is then formed on the recording layer 2. On the other side of the substrate 1C is provided an anti-reflection layer structure 4, so that a laser beam L is focused on the recording layer 2 through the anti-reflection layer structure 4 and the substrate 1.

Figure 6:
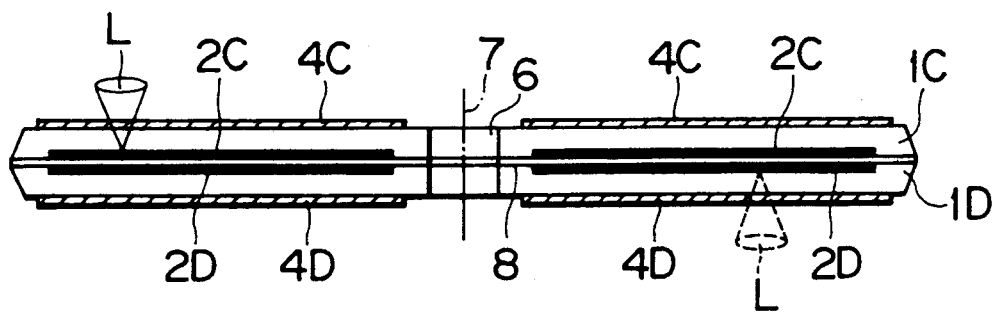
FIG. 6 is a schematic cross-sectional view of the structure of still another example of an optical information recording medium according to the present invention.

FIG. 6 is a schematic cross-sectional view of still another example of an optical information recording medium with a close-contact sandwich structure.

In this optical information recording medium, on one side of a substrate 1C which is transparent to a laser beam, and on one side of a substrate 1D which is transparent to the laser beam are respectively formed a recording layer 2C and a recording layer 2D, and on the other sides of the substrates 1C and 1D are respectively formed anti-reflection layer structures 4C and 4D, and the recording layers 2C and 2D are made integral by an adhesive layer 8 in such a configuration that the recording layers 2C and 2D are positioned in close vicinity with each other.

Figure 7:
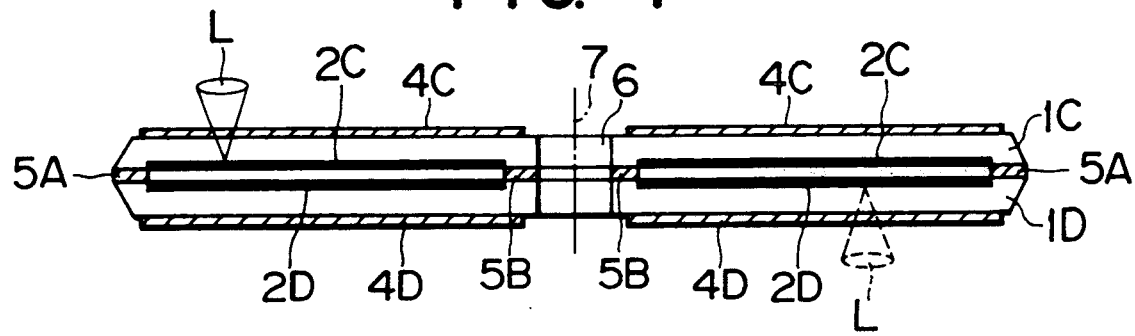
FIG. 7 is a schematic cross-sectional view of the structure of a further example of an optical information recording medium according to the present invention.

FIG. 7 is a schematic cross-sectional view of a further example of an optical information recording medium with an air sandwich structure.

In this optical information recording medium, on one side of a substrate 1C which is transparent to a laser beam, and on one side of a substrate 1D which is transparent to the laser beam are respectively formed a recording layer 2C and a recording layer 2D, and on the other sides of the substrates 1C and 1D are respectively formed anti-reflection layer structures 4C and 4D, and the recording layers 2C and 2D are positioned to closely face each other and made integral by spacers 5A and 5B.

In the examples shown in FIG. 6 and FIG. 7, the laser beam L is focused on each recording layer through the anti-reflection structure 4C or 4D.

The substrates 1, 1A, 1B, 1C and 1D are fabricated from a plastic resin such as polyvinyl chloride or acrylic resin, polycarbonate, or glass. The recording layers 2, 2A, 2B, 2C and 2D are formed of a metal such as Al, Au, Te, or Bi, or a pigment or a phase-changeable recording material.

In the structure as shown in FIG. 1, the protective layer 3 is transparent with respect to the laser beam. However, in the structure as shown in FIG. 5, it is not necessary that the protective layer 3A be transparent to the laser beam.

The anti-reflection layer structure is fabricated from (i) a transparent insulating film layer made of a material in accordance with the refractive indices of the protective layer 2 and the substrates 1, 1A, 1B, 1C and 1D, such as magnesium fluoride, silicone monoxide, silicon dioxide, titanium oxide, cerium oxide, and aluminum oxide, respectively having characteristic refractive indices, and employed as the materials for anti-reflection layers in conventional optical parts, based on "the design theory of anti-reflection layers" which are conventionally widely accepted in the field of optical parts, or from (ii) such a transparent insulating material in combination with an inorganic material having an refractive index of about 2 (n=2). Each individual layer which makes up the layer structure in this type of anti-reflection layer structure is so thin that the transparent electroconductive film layer can, for example, provide an adequate antistatic effect without being directly exposed to the outside.

In addition, the three-layer structure wherein the anti-relfection layer structure comprises a layer of $SiO_2$ with a thickness of $\lambda/4$; a layer of $In_2O_3$ with a thickness of $\lambda/2$; and a layer of SiO with a thickness of $\lambda/4$ with respect to the laser wavelength of $\lambda$, with these layers laminated in the order listed from the side in contact with the atmosphere to the recording medium side surface, not only provides a superior anti-reflection effect but also, because of its high mechanical strength, acts to protect the outer surface of the optical information recording medium.

A layer with a refractive index in the range 1.2 to 1.9, having a thickness of $(\lambda/4) \times (0.9$ to $1.6)$ with respect to the laser wavelength of $\lambda$, a layer with a refractive index in the range 1.5 to 2.5, having a thickness of $(\lambda/2) \times (0.1$ to $1.5)$ including a metal, and a layer with a refractive index in the range 1.2 to 1.9, having a thickness of $(\lambda/4) \times (0.75$ to $1.6)$, wherein these layers are laminated in the order listed from the side in contact with the atmosphere toward the recording medium side surface, also provides a superior anti-reflection effect, and the center layer in which the metal is included provides a superior antistatic effect.

Because the wavelength fluctuation range of the laser is small, the anti-reflection effect obtained by the above-mentioned combination in a narrow range which covers the wavelength fluctuation range of the laser is adequate. Therefore, it is acceptable that each layer is thin. As a result, the anti-reflection layer structure can be fabricated in a short layer formation time, and the productivity is excellent. and because the multilayer is thin, the layer formation time is short and productivity is excellent.

Figure 3:
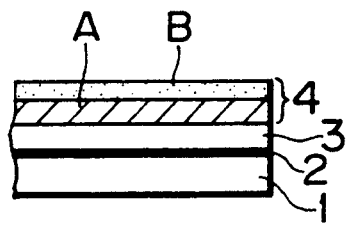
FIG. 3 is a partial cross-sectional view of an example of an optical information recording medium according to the present invention.

FIG. 3 shows part of an example of the optical information recording medium of the present invention of the single-sided recording type as shown in FIG. 1. The anti-reflection layer structure 4 provided on the protective layer 3 is formed from a transparent electroconductive film layer A and an anti-reflection film layer B. The transparent electroconductive film layer A which is directly provided on the protective layer 3 and accordingly close to the recording layer is a film layer with a thickness of $\lambda/4$, having a high refractive index, and the anti-reflection film layer B is a film layer with a thickness of $\lambda/4$, having a low refractive index.

Figure 4:
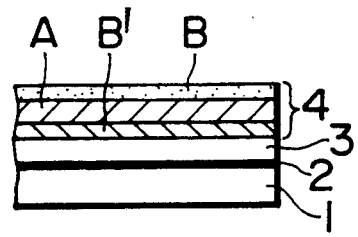
FIG.4 is a partial cross-sectional view of another example of an optical information recording medium according to the present invention.

FIG. 4 shows part of another example of the optical information recording medium of the present invention of the single-sided recording type as shown in FIG. 1. In this example, the anti-reflection layer structure 4 is formed on the protective layer 3 from the transparent electro-conductive film layer A and a pair of anti-reflection film layers B, B'. The anti-reflection film B' on the protective layer 3 is provided as a film layer with a thickness of $\lambda/4$, having a low refractive index. The transparent electro-conductive film layer A, provided as a film layer with a thickness of $\lambda/2$, having a high refractive index on the anti-reflection film layer B', is interposed between the anti-reflection film B provided as a film layer with a thickness of $\lambda/4$, having a low refractive index on the upper surface of the transparent conductive film layer A, and the anti-reflection film layer B'. In the case of this anti-reflection layer structure with the three layers, if the resistivity of the transparent electroconductive film layer A is about $10^2 \, \Omega/\square$, the resistivity at the surface of the anti-reflection layer structure is about $10^6 \, \Omega/\square$. The effective surface resistivity for antistatic effect is $10^8$ to $10^9 \, \Omega/\square$ or less, so that, in the same manner as the above-mentioned example with the three-layer structure, when the transparent electroconductive film layer is interposed between electrically insulating anti-reflection layers an adequate anti-static effect is obtained. It is obvious that an anti-reflection layer structure can be formed in accordance with the explanations of FIG. 3 and FIG. 4 on both outer surface sections of the optical information recording medium of the air sandwich type of FIG. 2.

Figure 8:
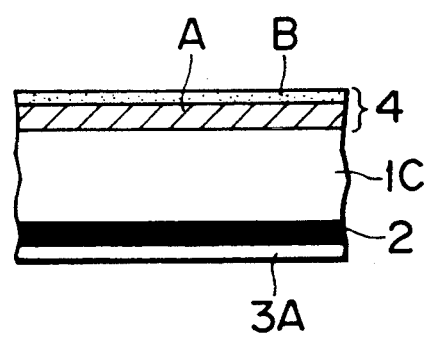
FIG. 8 is a partial cross-sectional view of a further example of an optical information recording medium according to the present invention.

FIG. 8 shows part of a further example of the optical information recording medium of the present invention of the type as shown in FIGS. 2, 5, 6 and 7, in which the recording layer 2 and the anti-reflection layer structure 4 were formed on the opposite sides of the substrate 1C. The anti-reflection layer structure 4 shown in FIG. 8 is composed of a transparent electroconductive film layer A and an anti-reflection film layer B in the same manner as in the example shown in FIG. 3. The transparent electroconductive film layer A which is closest to the recording layer 2 via the substrate 1 is a film layer with a thickness of $\lambda/4$ to $\lambda/2$, having a high refractive index, and the anti-reflection film layer B is a film layer with a thickness of $\lambda/4$, having a low refractive index.

Figure 9:
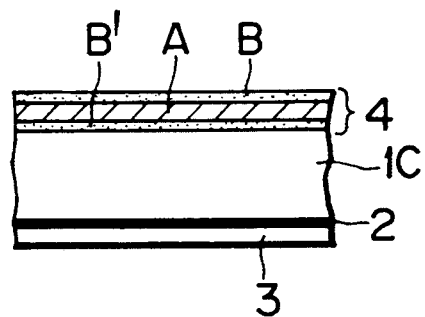
FIG. 9 is a partial cross-sectional view of still another example of an optical information recording medium according to the present invention.

FIG. 9 shows part of still another example of the optical information recording medium of the present invention of the type as shown in FIGS. 2, 5, 6 and 7, in which the recording layer 2 and the anti-reflection layer structure 4 are formed on the opposite sides of the substrate 1C. In this example, the anti-reflection layer structure 4 has the same three-layer structure comprising a transparent electroconductive film layer A, and a pair of anti-reflection film layers B, B' as in the example shown in FIG. 4. The anti-reflection film layer B' which is directly formed on the substrate 1C and is closest to the recording layer 2 via the substrate 1C is a film layer with a thickness of $\lambda/4$, having a low refractive index. The transparent electroconductive film layer A provided on the anti-reflection layer B' is a film layer with a thickness of $\lambda/2$, having a high refreactive index. The anti-reflection layer B formed on the transparent electroconductive film layer A is a film layer with a thickness of $\lambda/4$, having a low refractive index.

The anti-reflection layer structure of a three-layer type as shown in FIG. 3 and FIG. 4 will now be explained more specifically. On the outer surface of a commercially available optical audio disk on which a reflection-type recording layer made from A1 was formed on a polycarbonate substrate, on which data was recorded according to the irregularities on this recording layer, a layer of $SiO_2$ with a thickness of $\lambda/4$, a layer of $In_2O_3$ with a thickness of $\lambda/2$, and a layer of SiO with a thickness of $\lambda/4$ with respect to the laser wavelength of $\lambda=780$ nm, were formed, laminated in the order listed, from side in contact with the atmosphere to the recording medium side surface, to provide an anti-reflection layer structure. The individual layers were formed by plasma evaporation. The SiO2 layer of the anti-reflection layer structure was in contact with the atmosphere. The reflectance of the outer layer of the optical information recording medium was reduced from 5% prior to the formation of the anti-reflection layer structure, to 1% after the formation of this anti-reflection layer structure, and as the amount of light reflected from the recording layer increased, the reliability of the data read-out increased.

This increase in the reliability of the data read-out caused a remarkable improvement in the quality of the sound reproduced from the optical audio disk. Specifically, when an audiovisual examination was carried out for sound reproduction and image with respect to commercial CDs and LDs on which an anti-reflection layer structure had been formed, in comparison with those on which an anti-reflection layer structure had not been formed, the results shown in the following table were obtained. Specifically, the following table gives the results of audiovisual evaluations by five examiners, A, B, C, D, and E. ⊚ indicates that a remarkable difference was observed; indicates some difference; and Δ indicates that no difference was evident.

TABLE

| Samples | A | B | C | D | E | Main comments |
|---|---|---|---|---|---|---|
| 1 | | | | | | High notes of a violin well brought out. |
| 2 | | | | | | Image orientation clear. Low notes soft, rich. |
| 3 | ⊚ | | | ⊚ | ⊚ | Image had solid feeling. |
| 4 | | Δ | | | | Solid feeling to vocals. Orientation, low level reproduction good. |
| 5 | Δ | | | Δ | Δ | Vocals good. |
| 6 | | Δ | Δ | Δ | Δ | Orientation clear. Background low level improved. |
| 7 | | Δ | ⊚ | | ⊚ | |
| 8 | ⊚ | Δ | ⊚ | | ⊚ | Synthesizer notes clear. |
| 9 | ⊚ | Δ | ⊚ | | ⊚ | Background piano accompaniment distinct. |
| 10 | ⊚ | Δ | ⊚ | | ⊚ | Vocals clear. |

As can be clearly understood from the above table, the sound reproduction and acoustic image quality were improved because of the anti-reflection layer structure. Also, the formed anti-reflection layer structure is extremely rugged, a result of 5H or more being obtained for the surface hardness by the lead pencil test.

When $MgF_2$ was substituted for the SiO2 in the three-layer anti-reflection layer structure, the results obtained were almost identical to the above results.

In another example of the present invention, when a layer of $SiO_2$ with a thickness of $(\lambda/4)\times(0.9$ to $1.6)$, a layer of $In_2O_3$ with a thickness of $(\lambda/2)\times(0.1$ to $1.5)$, and a layer of SiO with a thickness of $(\lambda/4)\times(0.75$ to $1.6)$ with respect to the laser wavelength of $\lambda=780$ nm, were formed, laminated in the order listed from the side in contact with the atmosphere to the recording medium side surface, to provide an anti-reflection layer structure on the outer surface of commercial CDs and LDs, the reflectance of the outer layer of the optical information recording medium was reduced to less than 1%, and the electrical resistivity of the surface was less than $10^8 \Omega/\square$ less. Almost no dust was seen to adhere to any of these examples during dust tests.

Thus, a novel optical information recording medium is provided by the present invention. This optical information recording medium, as described above, has an anti-reflection layer structure on its outer surface onto which the laser beam is directed, therefore the effects of the problems of reflection of the laser beam from the outer surface and static formation on the optical information recording medium are eliminated, resulting in an improvement in the reliability of the write-in and read-out of information. Furthermore, from the explanation of the examples of the present invention, it can be understood that the relationship between the refractive indices of the anti-reflection layer and the transparent electroconductive film layer is set to suit the general anti-reflection conditions, and because the wavelength of the laser beam for which the optical information recording medium is the target is in a narrow region, a V-coat or the like, which is conventionally used as a filter, may be formed to basically provide anti-reflection and anti-static properaties by selection of the anti-reflection material and the film thickness and the like with respect to the wavelength region of the laser beam. Also, in the field of conventional thin-film coatings, an intermediate layer to increase the mutual contact properties, and a protective layer are provided, but also in the present invention, as required, an intermediate layer may be provided within the anti-reflection layer structure to form a protective film in the anti-reflection layer structure.

What is claimed is:

1. An optical information recording medium, for writing in and reading out information by means of a laser beam, comprising a recording layer, an anti-reflection layer structure formed on an outer surface section on which the laser beam is directed to be focused, on said recording layer, said anti-reflection layer structure comprising one or more transparent electroconductive film layers.

2. The optical information recording medium as claimed in claim 1, wherein said anti-reflection layer structure comprises (a) a layer of $SiO_2$ with a thickness of $\lambda/4$, (b) a layer of $In_2O_3$ with a thickness of $\lambda/2$, and (c) a layer of SiO with a thickness of $\lambda/4$, with respect to a wavelength of the laser beam $\lambda$, said layers being laminated in the order listed from the side in contact with the atmosphere to the surface side of said recording medium.

3. The optical information recording medium as claimed in claim 2, wherein said recording layer for recording information to be read out is a reflection type metal film layer with irregularities corresponding to the recorded information; and said anti-reflection layer structure is formed on an outer surface section onto which is directed the laser beam to be focused on said recording layer.

4. The optical information recording medium as claimed in claim 2, wherein said information recorded on said recording layer is audio information and/or video information.

5. The optical information recording medium as claimed in claim 1, wherein said anti-reflection layer structure comprises (a) a layer with a refractive index in the range 1.2 to 1.9, having a thickness of $(\lambda/4)\times(0.9$ to $1.6)$, (b) a layer with a refractive index in the range 1.5 to 2.5, having a thickness of $(\lambda/2)\times(0.1$ to $1.5)$ comprising a metal, and (c) a layer with a refractive index in the range 1.2 to 1.9, having a thickness of $(\lambda/4) \times (0.75$ to 1.6), with respect to a wavelength of the laser beam $\lambda$, said layers being laminated in the order listed from the side in contact with the atmosphere to the surface side of said recording medium.

6. The optical information recording medium as claimed in claim 5, wherein said recording layer for recording information to be read out is a reflection type metal film layer with irregularities corresponding to the recorded information; and said anti-reflection layer structure is formed on an outer surface section onto which is directed the laser beam to be focused on said recording layer.

7. The optical information recording medium as claimed in claim 5, wherein said information recorded on said recording layer is audio information and/or video information.

8. The optical information recording medium as claimed in claim 1, wherein said anti-reflection layer structure comprises (a) a layer with a refractive index in the range 1.2 to 1.7, having a thickness of $(\lambda/4) \times (0.75$ to 1.6), and (b) a layer with a refractive index in the range 1.7 to 2.5, having a thickness of $(\lambda/4) \times (0.1$ to 2.2), with respect to a wavelength of the laser beam $\lambda$, said layers being laminated in the order listed from the side in contact with the atmosphere to the surface side of said recording medium.

9. The optical information recording medium as claimed in claim 8, wherein said recording layer for recording information to be read out is a reflection type metal film layer with irregularities corresponding to the recorded information; and said anti-reflection layer structure is formed on an outer surface section onto which is directed the laser beam to be focused on said recording layer.

10. The optical information recording medium as claimed in claim 8, wherein said information recorded on said recording layer is audio information and/or video information.

11. The optical information recording medium as claimed in claim 1, wherein said recording layer for recording information to be read out is a reflection type metal film layer with irregularities corresponding to the recorded information; and said anti-reflection layer structure is formed on an outer surface section onto which is directed the laser beam to be focused on said recording layer.

12. The optical information recording medium as claimed in claim 1, wherein said information recorded on said recording layer is audio information and/or video information.

* * * * *